United States Patent
Ji et al.

(10) Patent No.: US 11,076,359 B2
(45) Date of Patent: Jul. 27, 2021

(54) DEVICE, SYSTEM, AND METHOD FOR ADAPTIVE TRANSMISSION POWER ALLOCATION IN UPLINK CARRIER AGGREGATION

(71) Applicant: Apple Inc., Cupertino, CA (US)

(72) Inventors: Zhu Ji, San Jose, CA (US); Ruirui Zong, Beijing (CN); Wenshan Pan, Beijing (CN); Lei Li, Beijing (CN); Yaoqi Yan, Beijing (CN); Elliot S. Briggs, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 75 days.

(21) Appl. No.: 16/607,169

(22) PCT Filed: Jun. 2, 2017

(86) PCT No.: PCT/CN2017/086960
§ 371 (c)(1),
(2) Date: Oct. 22, 2019

(87) PCT Pub. No.: WO2018/218645
PCT Pub. Date: Dec. 6, 2018

(65) Prior Publication Data
US 2020/0389848 A1 Dec. 10, 2020

(51) Int. Cl.
| | |
|---|---|
| *H04W 52/20* | (2009.01) |
| *H04W 52/14* | (2009.01) |
| *H04L 1/20* | (2006.01) |
| *H04W 52/36* | (2009.01) |
| *H04W 72/04* | (2009.01) |
| *H04W 52/34* | (2009.01) |

(52) U.S. Cl.
CPC .......... *H04W 52/146* (2013.01); *H04L 1/203* (2013.01); *H04W 52/20* (2013.01); *H04W 52/346* (2013.01); *H04W 52/367* (2013.01); *H04W 72/0413* (2013.01)

(58) Field of Classification Search
CPC ..................................................... H04W 52/20
USPC ........................................................ 370/329
See application file for complete search history.

(56) References Cited

U.S. PATENT DOCUMENTS

| | | |
|---|---|---|
| 2011/0081936 A1 | 4/2011 | Haim et al. |
| 2011/0292874 A1 | 12/2011 | Ho et al. |
| 2015/0230206 A1 | 8/2015 | Tabet et al. |

(Continued)

*Primary Examiner* — Dang T Ton
(74) *Attorney, Agent, or Firm* — Fay Kaplun & Marcin, LLP (57) ABSTRACT

A device, system, and method adaptively adjusts uplink power transmission to component carriers in carrier aggregation. The method is performed at a user equipment configured with a carrier aggregation functionality including a primary component carrier (PCC) and a secondary component carrier (SCC), the UE using a first transmit power for an uplink transmission on the PCC and using a second transmit power for the uplink transmission on the SCC. The method includes determining whether a total transmit power including the first and second transmit powers for the uplink transmission exceeds a predetermined threshold. The method includes, when the total transmit power exceeds the predetermined threshold, adjusting the first transmit power based on a connectivity parameter for the PCC. The method includes adjusting the second transmit power based on the adjusting of the first transmit power.

22 Claims, 3 Drawing Sheets

(56) References Cited

U.S. PATENT DOCUMENTS

2016/0081045 A1    3/2016  Bostrom et al.
2020/0137796 A1*  4/2020  Jung .................... H04W 24/08

* cited by examiner

DEVICE, SYSTEM, AND METHOD FOR ADAPTIVE TRANSMISSION POWER ALLOCATION IN UPLINK CARRIER AGGREGATION

BACKGROUND INFORMATION

A user equipment (UE) may be configured with a variety of different capabilities. For example, the UE may be capable of establishing a connection with a network. Specifically, the UE may connect to a Long Term Evolution (LTE) network. While connected to the LTE network, the UE may utilize further network capabilities. For example, the UE may utilize a carrier aggregation (CA) functionality in which a primary component carrier (PCC) and at least one secondary component carrier (SCC) are used to communicate data over the various LTE bands. The network component to which the UE has connected may be an evolved Node B (eNB) that provides the PCC. The connected eNB may also control how the carrier aggregation is to be utilized with the SCCs. For example, the eNB may request measurements for LTE bands which are associated with the SCCs and receive the measurements to determine how the available bands are to be used in the carrier aggregation functionality. Thus, the UE may have a plurality of LTE bands or carriers that are available to communicate data.

In using the carrier aggregation functionality, each of the component carriers may be used to perform an uplink transmission. In performing this uplink transmission, each of the component carriers may use a respective uplink transmit power. Accordingly, the uplink transmit power from each of the component carriers may be added to determine a total uplink transmit power that is used by the UE. A measurement of the total uplink transmit power may also be used in determining how the uplink transmission power is to be allocated to the component carriers. However, when the total uplink transmit power exceeds a predetermined threshold, the available uplink transmit power may be allocated in an uneven manner. For example, the PCC may be allocated much of the available uplink transmit power while the one or more SCCs may be allocated little to none of the available uplink transmit power. In particular, the PCC may be configured with uplink control information (UCI) such that the above noted scenario may result where the PCC is allocated most of the available uplink transmit power where the allocated amount is an overestimation.

SUMMARY

The exemplary embodiments describe a method, comprising: at a user equipment configured with a carrier aggregation functionality including a primary component carrier (PCC) and a secondary component carrier (SCC), the UE using a first transmit power for an uplink transmission on the PCC and using a second transmit power for the uplink transmission on the SCC: determining whether a total transmit power including the first and second transmit powers for the uplink transmission exceeds a predetermined threshold; when the total transmit power exceeds the predetermined threshold, adjusting the first transmit power based on a connectivity parameter for the PCC; and adjusting the second transmit power based on the adjusting of the first transmit power.

The exemplary embodiments describe a user equipment, comprising: a transceiver configured to connect the user equipment to a first network component serving a primary component carrier (PCC) and a second network component serving a secondary component carrier (SCC), the UE using a first transmit power for an uplink transmission on the PCC and using a second transmit power for the uplink transmission on the SCC; and a processor determining whether a total transmit power including the first and second transmit powers for the uplink transmission exceeds a predetermined threshold, when the total transmit power exceeds the predetermined threshold, the processor adjusting the first transmit power based on a connectivity parameter for the PCC, the processor adjusting the second transmit power based on the adjusting of the first transmit power.

The exemplary embodiments describe an integrated circuit, comprising: circuitry to determine whether a total transmit power including a first transmit power and a second transmit power for an uplink transmission exceeds a predetermined threshold, the first uplink transmission being used on a primary component carrier (PCC) of a carrier aggregation functionality, the second uplink transmit power being used on a secondary component carrier (SCC) of the carrier aggregation functionality; when the total transmit power exceeds the predetermined threshold, circuitry to adjust the first transmit power based on a connectivity parameter for the PCC; and circuitry to adjust the second transmit power based on the adjusting of the first transmit power.

DETAILED DESCRIPTION

The exemplary embodiments may be further understood with reference to the following description and the related appended drawings, wherein like elements are provided with the same reference numerals. The exemplary embodiments are related to a device, system, and method for dynamically allocating uplink transmit power used in a carrier aggregation (CA) functionality. Specifically, a user equipment (UE) may be connected to a Long Term Evolution (LTE) network in which the UE and the LTE network are configured with the CA functionality where the CA functionality may include a primary serving cell (PCell) providing a primary component carrier (PCC) and at least one secondary serving cell (SCell) respectively providing a secondary component carrier (SCC). The exemplary embodiments provide a mechanism where a power scaling factor is adaptively adjusted for the component carriers on the basis of ensuring a PCell performance while allocating uplink transmit power for the SCell to achieve an overall uplink performance improvement.

It should be noted that the exemplary embodiments are described herein with regard to carrier aggregation performed on a LTE network. However, the use of the LTE network is only exemplary. The exemplary embodiments may be modified and/or used with any network that supports carrier aggregation or a substantially similar functionality in which a plurality of component carriers is used. It should also be noted that further features associated with the LTE network are also only exemplary. For example, uplink control information may be a feature of a LTE control channel. However, the exemplary embodiments may utilize any control or channel that has the characteristics as described herein for the uplink control information.

The exemplary embodiments relate to configurations where the UE may associate with a network component which serves as the PCell. In a LTE network, the network component may be an evolved Node B (eNB). The PCell may control the manner in which the data is exchanged with the UE such as determining when uplink and downlink grants are given for the UE. The PCell may also control the mechanism used in exchanging data, particularly how data is transmitted to and received by the UE. Specifically, the UE and the PCell may utilize uplink control information (UCI) provided over a physical uplink shared channel (PUSCH) transmission or physical uplink control channel (PUCCH) transmission where uplink related parameters may be included (e.g., scheduling request, hybrid automatic repeat request (HARQ) ACK/NACK, channel quality indicator (CQI), etc.). When the UE is CA capable, CA functionality enables the PCell and a further SCell to combine bandwidths to exchange data with the UE thereby increasing a rate of data exchange. The SCell may also be configured and activated/deactivated by the eNB based on throughput requirements. Thus, with CA, the PCell may provide a first portion of a total bandwidth for data to be exchanged while the SCell may provide a second portion of the total bandwidth. When further SCells are used, the PCell may provide the first portion of the total bandwidth, the first SCell may provide the second portion of the total bandwidth, a second Scell may provide a third portion of the total bandwidth, and so on.

Although the CA functionality may provide an increased bandwidth available to transmit data, the power that is devoted to the exchange of data, particularly in the uplink direction, may be distributed among the corresponding component carriers in an inefficient manner. In addition to possibly scaling down the uplink transmission power for the component carriers, there may be an additional power back off that is used for the uplink CA operations. For example, this additional power back off may be due to an increased peak to average power ratio (PAPR) and intermodulation effects in the radio frequency (RF). In this manner, the maximum uplink transmission power may be further limited.

Those skilled in the art will understand that there are various predefined manners of scaling power for uplink transmissions performed by the UE. For the PUSCH transmit power scaling in uplink CA scenarios, the specification under 3GPP 36.213 Section 5.1.1.1 has defined several of these manners. In a first example, if the total transmit power of the UE across all component carriers used in the CA functionality were to exceed a predetermined maximum threshold $\hat{P}_{CMAX}(i)$, the UE scales the uplink transmission power $\hat{P}_{PUSCH,c}(i)$ for a given serving cell (both primary and secondary) in subframe i such that the following condition is met:

$$\sum_{c} w(i) \cdot \hat{P}_{PUSCH,c}(i) \leq \left(\hat{P}_{CMAX}(i) - \hat{P}_{PUCCH}(i)\right) \quad \text{(Formula 1)}$$

where w(i) is a scaling factor. Thus, when the total uplink transmit power exceeds this predetermined maximum threshold $\hat{P}_{CMAX}(i)$, the uplink transmit power on each component carrier is scaled down accordingly.

In a second example, the UE may have a PUSCH transmission with UCI on a serving cell j (in either primary or secondary) and a PUSCH transmission without UCI in any of the remaining serving cells (particularly secondary). In such a scenario, if the total transmit power of the UE across all the component carriers were to exceed the predetermined maximum threshold $\hat{P}_{CMAX}(i)$, the UE scales the uplink transmission power $\hat{P}_{PUSCH,c}(i)$ for a given serving cell without UCI in subframe i such that the following condition is met:

$$\sum_{c \neq j} w(i) \cdot \hat{P}_{PUSCH,c}(i) \leq \left(\hat{P}_{CMAX}(i) - \hat{P}_{PUSCH,j}(i)\right) \quad \text{(Formula 2)}$$

Thus, when the total uplink transmit power exceeds the predetermined maximum threshold $\hat{P}_{CMAX}(i)$, the UE scales down the transmit power for the serving cells without UCI. If this serving cell is scaled down enough, the SCell may become deactivated for use in the CA functionality (even if the SCell were still at a relatively good reference signal received power (RSRP) point, including both uplink SCC and associated downlink SCC).

It is noted that there may be no power scaling applied to the uplink transmit power $\hat{P}_{PUSCH,c}(i)$ for the serving cell with UCI unless formula 2 has a result of $$\sum_{c \neq j} w(i) \cdot \hat{P}_{PUSCH,c}(i) = 0$$

and the total transmit power of the UE would still exceed the predetermined maximum threshold $\hat{P}_{CMAX}(i)$. It is also noted that the values of the scaling factor w(i) may be the same across the serving cells (both primary and secondary) when w(i) is greater than zero. However, for certain serving cells, the scaling factor w(i) may be zero.

The above predefined manners of scaling power for uplink transmissions performed by the UE may have results where the total uplink throughput is negatively affected, particularly from SCCs corresponding to SCells being allocated little to none of the available uplink transmission power. Although the uplink transmission power for the UE may be shared among all the component carriers, there are various situations where the uplink transmission power is unevenly distributed. According to the 3GPP LTE standards, when the uplink transmit power on the serving cell with UCI (e.g., the PCell) is equal to or exceeds the predetermined maximum threshold $\hat{P}_{CMAX}(i)$, there is no remaining power for the serving cells without UCI. That is, the serving cell without UCI has its transmit power set to zero or allocated none of the available uplink transmit power. Usually, the PCell takes advantage of this scenario with UCI and the SCell becomes the victim.

However, the over-allocation of uplink transmit power to the PCell with UCI does not necessarily correspond to an equal gain to uplink throughput, particularly over a period of time. That is, the gain of over-allocating power on the PCell for UCI is limited. Furthermore, a high uplink block error rate (BLER) on the SCell due to the low uplink transmit power may significantly impact a total uplink throughput. Specifically, with UCI occurring very frequently and taking into consideration periodic CQI and downlink HARQ feedback, there is nearly no data throughput on the SCell over its corresponding SCC while the SCC is not allocated any of the available uplink transmit power. Eventually, the LTE network may deactivate or remove uplink scheduling over the SCC for the SCell.

In view of the PCell with UCI being allocated more power than may be needed, the exemplary embodiments provide a mechanism to adaptively adjust the uplink power allocation to the PCC and the SCC(s) associated with the PCell and the SCell(s), respectively. Specifically, the UCI may use robustness (e.g., slower data exchange rate, lower data transmission size, etc.) to ensure the decoding performance (e.g., for control information) rather than using extra power. The UCI may also be allocated time/frequency resources adjacent to reference signal (RS) symbols to increase the probability of having a better channel estimation performance. Furthermore, as an extension to the robustness, an offset between the code rate for modulation-and-coding scheme used for both a data part and a control-signaling part may be configured via higher-layer signaling to show that the UCI has a much lower code rate. Accordingly, the mechanism according to the exemplary embodiments may limit the over-allocation of the available uplink transmit power to the PCC corresponding to the PCell with UCI and re-allocate the available uplink transmit power to the SCC(s). Therefore, the UE may achieve a higher uplink throughput since the SCC may receive relatively stable uplink transmit power to maintain a scheduling of uplink transmissions.

Figure 1:
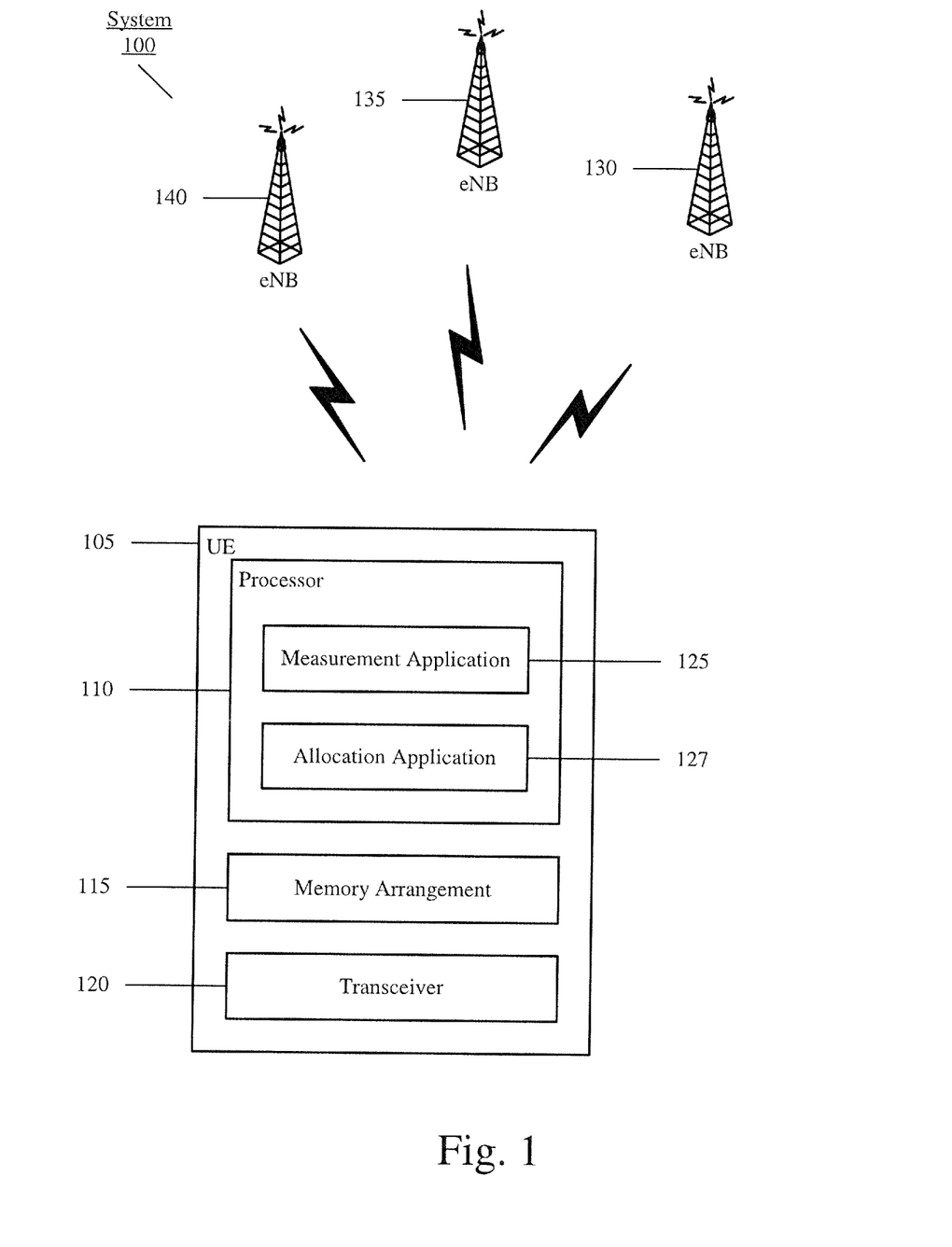
FIG. 1 shows a system where a user equipment using carrier aggregation allocates an uplink transmit power over component carriers according to various exemplary embodiments described herein.

FIG. 1 shows a system where a UE 105 using carrier aggregation allocates an uplink transmit power over component carriers according to various exemplary embodiments described herein. The system 100 includes the UE 105 and a plurality of eNBs 130, 135, 140. As discussed above, the UE 105 may associate with one of the eNBs 130-140 such as the eNB 130 to join the network corresponding to the eNB 130 such as a LTE network. The UE 105 and the eNBs 130-140 may also include the CA functionality that may be enabled and controlled by the eNB 130. As the UE 105 is associated with the eNB 130, the eNB 130 may provide the CA configuration for component carriers to be used by the UE 105 in which the eNB 130 may be the PCell and the eNBs 135, 140 may serve as the SCells. Accordingly, it may be assumed that the eNBs 135, 140 are within an operational range to utilize SCCs corresponding to the SCells (e.g., eNBs 135, 140).

The UE 105 may be any electronic device configured to join a network via the eNB 130. For example, the UE 105 may be a portable device such as a cellular phone, a smartphone, a tablet, a phablet, a laptop, a wearable, an Internet of Things (IoT) device, etc. In another example, the UE 105 may be a stationary device such as a desktop terminal. The UE 105 may also operate on a variety of different frequencies or channels (i.e., range of continuous frequencies). Accordingly, the UE 105 may include components that enable different radio access technologies. As shown in FIG. 1, the UE 105 may include a processor 110, a memory arrangement 115, and a transceiver 120. However, the UE 105 may also include further components such as a display device, an input/output (I/O) device, and other components such as a portable power supply, an audio I/O device, etc.

The processor 110 may be configured to execute a plurality of applications of the UE 105. For example, the applications may include a web browser when connected to a communication network via the transceiver 120. Accordingly, data may be exchanged with the network. More specifically, the data may be exchanged using the CA functionality to increase a rate in which the data is exchanged in uplink, downlink, or both. In another example, the applications may include a measurement application 125 that is configured to determine a plurality of different parameters and performance metrics associated with the connections to the eNBs 130-140. As will be described in further detail below, the measurement application 125 may determine an amount of power being used across all component carriers to perform uplink transmissions. In a further example, the applications may include an allocation application 127 that is configured to receive measurements from the measurement application 125 and allocate power to the component carriers being used for the CA functionality. As will be described in further detail below, the allocation application 127 may adjust a scaling factor associated with allocating the power to the component carriers.

It should be noted that the above noted applications being an application (e.g., a program) executed by the processor 110 is only exemplary. The applications may also be represented as components of one or more multifunctional programs, a separate incorporated component of the UE 105 or may be a modular component coupled to the UE 105, e.g., an integrated circuit with or without firmware. In addition, in some UEs, the functionality described for the processor 110 is split among two processors, a baseband processor and an applications processor. The exemplary embodiments may be implemented in any of these or other configurations of a UE.

The memory arrangement 115 may be a hardware component configured to store data related to operations performed by the UE 105. Specifically, the memory arrangement 115 may store measurements associated with different component carriers used by the UE 105 in a CA functionality.

Figure 2:
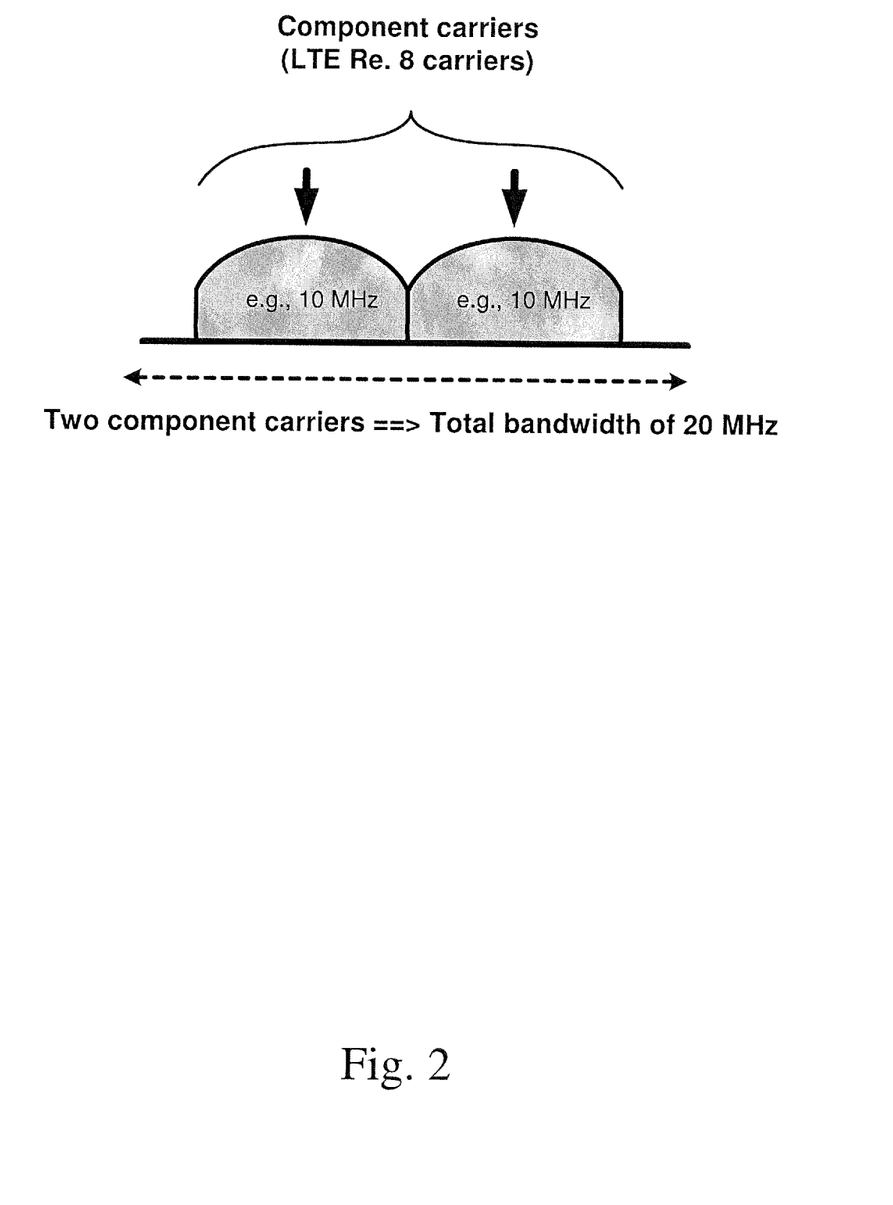
FIG. 2 shows an example of carrier aggregation.

Using the CA functionality, the eNB 130 may serve as the PCell while the eNBs 135, 140 may serve as at least one of the SCells. FIG. 2 shows an example of carrier aggregation. As shown in FIG. 2, the PCell may provide a first component carrier of 10 MHz representing a primary component carrier (PCC) operating on a first LTE band while the SCell may provide a second component carrier of 10 MHz representing the secondary component carrier (SCC) operating on a second LTE band. Also shown in FIG. 2 is one type of carrier aggregation. Specifically, FIG. 2 shows the two component carriers in an intra-band carrier aggregation with continuous component carriers. However, those skilled in the art will understand that other types of carrier aggregation may also be used such as intra-band carrier aggregation with non-continuous component carriers, inter-band carrier aggregation, or any combination of these three types. Furthermore, those skilled in the art will understand that other bandwidths may be used such as 1.4, 3, 5, 15, or 20 MHz and typically a maximum of five component carriers may be aggregated. As illustrated in FIG. 2, two component carriers each having a bandwidth of 10 MHz may be combined for a total bandwidth of 20 MHz. In a specific example, with carrier aggregation features enabled, the LTE-Advanced standard device supporting 20 MHz carrier aggregation may achieve downlink ("DL") throughput of 1,000 Mbps (when the maximum of five component carriers are aggregated). In another example, a theoretical maximum closer to 150 Mbps may be achieved such as with only two 10+10 carriers aggregated.

It should be noted that the network shown in the system 100 is only exemplary. For example, the number of eNBs 130-140 that may be in communicative range of the UE 105 may be more or fewer than three. Those skilled in the art will also understand that there may be any number of other types of networks that may also be in communicative range of the UE 105 and that the UE 105 may also be configured to establish connections therewith. That is, the UE 105 may also connect using different radio access technologies (RATs). For example, the system 100 may further include a legacy radio access network, a wireless local area network, a WiFi network, etc. If configured for such a capability, the CA functionality may even be used between other types of networks. However, for exemplary purposes, the CA functionality is described herein with regard to the LTE network and the component carriers being provided by the eNBs 130-140.

Those skilled in the art will understand that the CA functionality only provides a potential of increased transmission efficiency. That is, the UE 105 may only realize the maximum increased transmission efficiency when conditions permit. However, there may be conditions that exist where the transmission efficiency under the CA functionality when transmitting uplink data from the UE 105 to the eNB 130 is not increased. For example, under conventional approaches, the UE 105 may schedule an uplink transmission on a carrier that has a poor connection quality. In another example, the PCell of the UE 105 may only have a portion of the available uplink transmission power due to the SCells also being allocated a portion of the available uplink transmission power.

The exemplary embodiments are configured to enhance the CA functionality when performing uplink transmissions by improving the uplink performance by preventing an over-allocation of uplink transmit power to the PCC and allocating a more stable and greater amount of power to the SCCs. The exemplary embodiments provide a plurality of different operations used in determining when and how a modified scaling factor is required and used to allocate the uplink transmission power to the component carriers. It is noted that these operations may be implemented independently or with some or all of the other operations.

An initial operation performed by the UE 105 may be to determine whether or not the modified scaling factor is to be used. As noted above, the measurement application 125 may determine a plurality of different parameters and performance metrics associated with the connections to the eNBs 130-140. Specifically, the measurement application 125 may determine an amount of power being used across all component carriers to perform uplink transmissions. The measurement application 125 may utilize any operation to determine the uplink transmit power that is being used by a specific component carrier. Thereafter, the measurement application 125 may sum the individual uplink transmit powers to determine the total uplink transmit power. In this manner, the total uplink transmit power is compared to the predetermined maximum threshold $\hat{P}_{CMAX}(i)$. If the total uplink transmit power is at most the predetermined maximum threshold $\hat{P}_{CMAX}(i)$, the UE 105 may continue to utilize the uplink power allocation currently set for the component carriers. However, if the total uplink transmit power is greater than the predetermined maximum threshold, the measurement application 125 may provide a signal (and other associated information) for the allocation application 127 to perform its functionality.

As described above, the allocation of the uplink transmit power across the component carriers may become unevenly distributed in a substantial way with a majority or all of the available uplink transmit power being allocated to the PCC with UCI. Therefore, for illustrative purposes, the exemplary embodiments are described with regard to subframes in which the PCC is with the UCI. Accordingly, the determination of the allocation of the uplink transmit power may be during these subframes and measurements derived during these subframes. However, the use of the subframes when the PCC is with the UCI is only exemplary. As those skilled in the art will understand, the exemplary embodiments may be modified and also used during subframes when the PCC is without the UCI.

As noted above, the allocation application 127 may allocate power to the component carriers being used for the CA functionality. The allocation application 127 may first determine the setting for the allocation of the uplink transmit power. Specifically, the allocation application 127 may determine if the allocation setting is without any modification to the power scaling factor. When a standard power scaling factor is being utilized for the allocation of the uplink transmit power, the allocation application 127 may utilize an initial power allocation setting. Specifically, the allocation application 127 may use a fair distribution of the uplink transmit power. For example, the fair distribution may be based on results of a water-filling algorithm. Specifically, the results of the water-filling algorithm may be on subframes that the PCell is with the UCI and when power is limited between the PCell and the SCell(s). As those skilled in the art will understand, the water-filling algorithm is a solution to maximize a parallel gaussian channel capacity given a total power limit.

Once the uplink transmit power has been allocated to the PCC and the SCC(s) based on this fair distribution, the allocation application 127 may determine how to modify this initial allocation setting based on measurements of connectivity parameters determined by the measurement application 125. Specifically, the measurement application 125 may track the average BLER of the PCell and SCells on subframes where the PCell is with UCI. The UE 105 may utilize any operation to receive or determine data used in calculating the BLER for the measurement application 125 to subsequently determine the average BLER for the PCell and the SCells at the appropriate subframes. Based on the average BLER values determined by the measurement application 125 and provided to the allocation application 127, the allocation application 127 may adaptively adjust the power scaling factor for uplink subframes that the PCell is with UCI to meet the UCI subframe BLER target (hereinafter referred to as "BLER threshold"). For example, the BLER threshold may be set to 10% but any BLER threshold may be defined.

It is noted that the UE 105 may utilize various operations to determine the BLER for the component carriers. In a first example, the measurement application 125 may utilize a sliding window algorithm (e.g., a sliding window of 160 ms). Specifically, the BLER may be calculated (e.g., in a monitoring window of 100 ms) as a ratio of a total number of first retransmissions to a total number of initial transmissions. The sliding window length may be predetermined and/or moved with 10 ms increments. In a second example, the measurement application 125 may utilize an infinite impulse response (IIR) algorithm. Specifically, the BLER for a selected time may be calculated as: BLER(i)=BLER(i−1)*(1−a)+CRC(i)*a, where i is a selected time, a is a predetermined value, and CRC is based on whether a physical HARQ indicator channel (PHICH) is an ACK (e.g., if PHICH==ACK, then CRC(i)=0, else CRC(i)=1).

Accordingly, the allocation application 127 may receive BLER measurements from the measurement application 125 to adjust the allocation of the uplink transmit power to the component carriers being used for the CA functionality. The allocation application 127 may adjust a scaling factor associated with allocating the uplink transmit power to the component carriers. According to the exemplary embodiments of adjusting the power scaling factor based on the average uplink BLER, for each component carrier including both the PCell and the SCells, the allocation application 127 determines whether the measured BLER value associated with the serving cell is greater than or less than the BLER threshold. It is again noted that the allocation application 127 may be performing these operations when the total transmit power for the component carriers exceeds the predetermined maximum threshold.

According to a first manner of adjusting the power scaling factor, the measured BLER value for the PCC may be greater than the BLER threshold. When the measured BLER value for the PCC is greater than the BLER threshold, the allocation application 127 provides an increased power scaling factor on the PCell with a power scaling step (hereinafter referred to as "Delta") in each time window length that the BLER is monitored (hereinafter referred to as "BLER window"). The allocation application 127 may continue to increase the power scaling factor on the PCell until the measured BLER value for the PCC is less than the BLER threshold. In this manner, an efficient power allocation may be used for the PCell where the BLER is at most at a target BLER (e.g., the BLER threshold) and the power allocated to the PCC is not an over-allocation. Therefore, more power may be available for the SCCs.

According to a second manner of adjusting the power scaling factor, the measured BLER value for the PCC may be equal to or less than the BLER threshold. The allocation application 127 may decrease the power scaling factor for the PCC in view of the PCC being within a range of the BLER threshold. Accordingly, more power may be available for the SCCs. At the same time, the measured BLER value for a selected SCC (if a plurality of SCCs are being used) may be greater than the BLER threshold. Initially, it is noted that the BLER threshold for the PCC and the SCCs may be identical or different based on various considerations. However, for illustrative purposes, the BLER threshold for the PCC and the SCCs used herein is identical. In a substantially similar manner as the first manner described above, when the measured BLER value for a selected SCC is greater than the BLER threshold, the allocation application 127 provides an increased power scaling factor on a corresponding SCell with Delta in each BLER window. The allocation application 127 may continue to increase the power scaling factor on the corresponding SCell until the measured BLER value for the selected SCC is less than the BLER threshold. It is noted that the power scaling in the second manner may continue to be used while the measured BLER value of the PCC remains under the BLER threshold. Otherwise, the allocation application 127 may utilize the first manner to satisfy the BLER threshold for the PCC. In this manner, an efficient power allocation may be used for the selected SCell where the BLER is at most at a target BLER (e.g., the BLER threshold) and the power allocated to the SCC is also not an over-allocation.

It is noted that the various thresholds and predetermined durations such as the BLER threshold, the Delta, and the BLER window may be predetermined on the UE 105. For example, the thresholds/durations may be pre-defined and stored on the memory arrangement 115 of the UE 105 (e.g., in a non-volatile memory (NVM)). Accordingly, an administrator may enter the values for these thresholds/durations to be used by the UEs connected to the LTE network. It is also noted that, instead of being a predetermined value entered by an administrator, the BLER threshold may be learned by the UE 105. For example, statistics of PUSCH with or without UCIs may be used. Thus, PHICH or adaptive uplink grants may be used to track the BLER threshold at the UE 105. In this manner, the BLER threshold may be dynamically updated to reflect the network uplink outer-loop behavior to optimize the proactive power allocation operations according to the exemplary embodiments. That is, the self-learning mechanism may track the uplink BLER target used in close-loop power control and use this information to adaptively change the PCell UCI BLER threshold to match a network parameters and achieve an improved uplink throughput.

It is also noted that the second manner of adjusting the power scaling factor is only exemplary. Specifically, the second manner incorporating operations to determine whether the SCCs are within the BLER threshold is only exemplary. According to another exemplary second manner of adjusting the power scaling factor, when the measured BLER value for the PCC is equal to or less than the BLER threshold, the allocation application 127 may decrease the power scaling factor for the PCC in view of the PCC being within a range of the BLER threshold. Accordingly, more power may be available for the SCCs. The remaining available power after allocating power to the PCC based on the decreased power scaling factor may be distributed to the SCCs in a predetermined manner. For example, the one or more SCCs may be allocated an even distribution of the remaining available power. Therefore, the BLER threshold operations for the SCCs may be omitted and a predetermined distribution of the remaining available power may be used.

In a particular implementation of adaptively adjusting the power scaling factor $w(i)$, the allocation application 127 may determine a different value to be used for the power scaling factor $w(i)$ in Formula 1 and Formula 2. Further still, the power scaling factor may be determined and used for a PUSCH with or without UCI. According to a first exemplary implementation of using the power scaling factor $w(i)$, the $w(i)$ may be determined dynamically based on various connectivity parameters and measurements. For example, the $w(i)$ may be determined based on the PUSCH BLER, a transmit power to transport block (TB) size (e.g., a power efficiency), the UCI, etc. Using these various measurements, the allocation application 127 may determine a corresponding power scaling factor $w(i)$ to determine the power allocation to the PCell and the SCells. According to a second exemplary implementation of using the power scaling factor $w(i)$, the $w(i)$ may be determined based a predefined table. For example, the table may be created to identify the power scaling factor $w(i)$ varying with a total power needed to be scaled. The table may also be predefined and stored in the NVM. Thus, using the first or second exemplary implementation, a proper minimum transmit power may be set for the SCell when scaling down is permitted.

It is noted that when the SCell has been scaled down to a minimum transmit power, the allocation application 127 may trigger a subsequent operation. The allocation application 127 may instruct that a signal indicative of the power headroom (PHR) being less than zero be reported for the SCell at the earliest opportunity. By scaling down the PCell and the SCells through adjusting the power scaling factor $w(i)$, the total configured transmit power may approach an upper limit defined by the LTE Specifications (e.g., the predetermined maximum threshold $P_{CMAX}(i)$).

The exemplary embodiments may be enabled based on various considerations. For example, the features of the exemplary embodiments may be enabled as a default setting. Accordingly, the power allocation may be determined whenever the total uplink transmit power has exceeded the predetermined maximum threshold $\hat{P}_{CMAX}(i)$. In another example, the features of the exemplary embodiments may be enabled under certain conditions. Specifically, the features may be enabled when the PUSCH BLER is below a corresponding threshold, when the buffer status report (BSR) is above a corresponding threshold, when the downlink throughput on the SCC remains high, etc. By using the features according to the exemplary embodiments, the use of the CA functionality may be extended in the middle RSRP areas where the total uplink transmit power is likely to exceed the predetermined maximum threshold $\hat{P}_{CMAX}(i)$.

Figure 3:
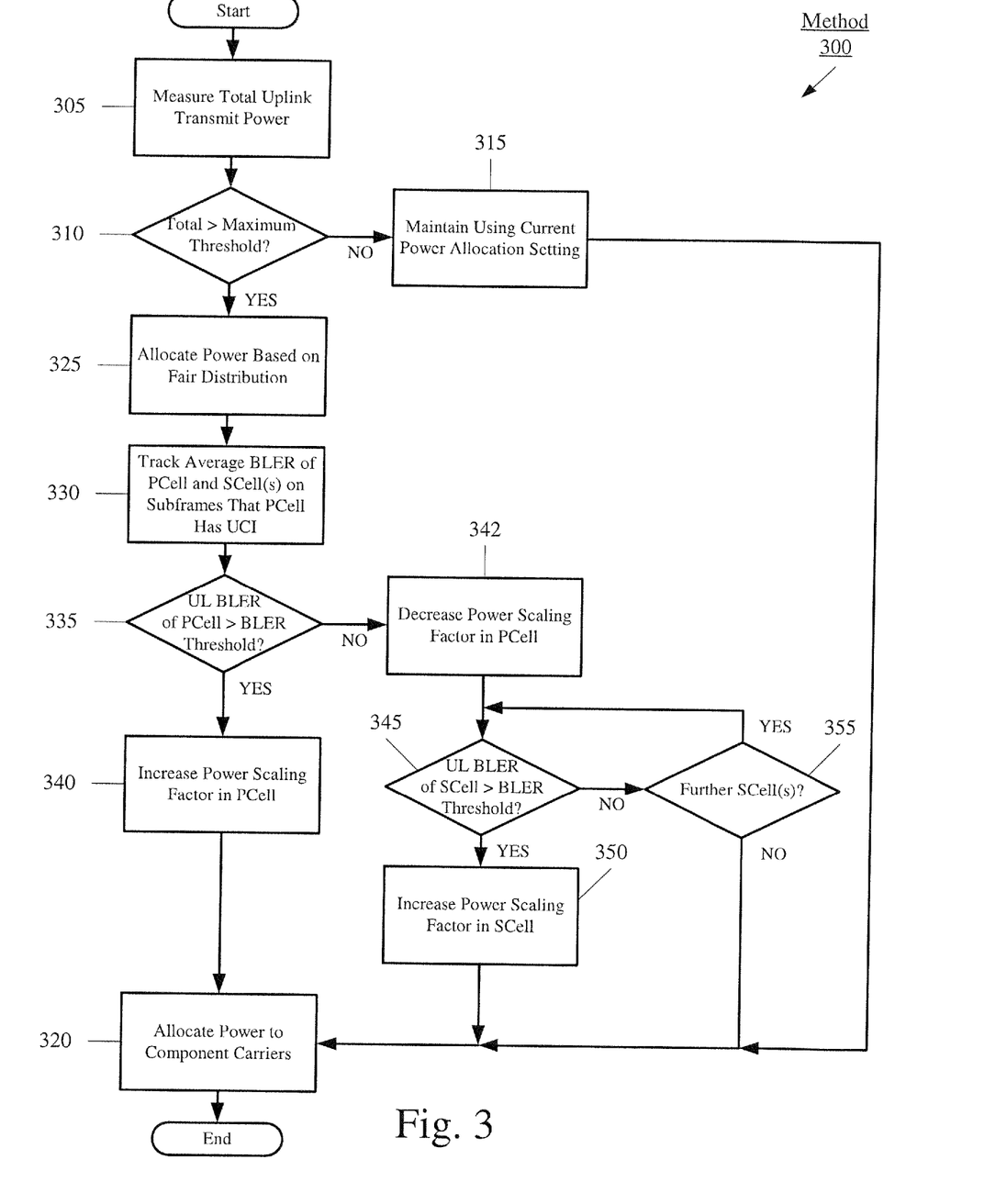
FIG. 3 shows a method for determining an allocation of uplink transmit power for component carriers of carrier aggregation according to various exemplary embodiments described herein.

FIG. 3 shows a method 300 for determining an allocation of uplink transmit power for component carriers of CA according to various exemplary embodiments described herein. The method 300 may relate to how the UE 105 determines when the features of the exemplary embodiments are to be utilized and subsequently how the features are to be applied to allocate the available uplink transmit power across the plurality of component carriers. The method 300 will be described from the perspective of the UE 105. Thus, the method 300 is performed by the UE 105 and the method 300 will be described with regard to the system 100 of FIG. 1.

In 305, the UE 105 may measure the total uplink transmit power across the component carriers of the CA functionality. Specifically, the uplink transmit power associated with the PCC corresponding to the PCell and the one or more uplink transmit powers associated with respective SCCs corresponding to the SCells. Subsequently, the total uplink transmit power may be measured. It is again noted that the exemplary embodiments may be implemented during subframes where the PCell is with the UCI. Accordingly, the uplink transmit powers that are measured may be during these subframes.

In 310, the UE 105 determines whether the total uplink transmit power is greater than a predetermined maximum threshold $\hat{P}_{CMAX}(i)$. As described above, the over-allocation of uplink transmit power to the PCell (and possible certain SCells) may contribute to conditions where the total uplink transmit power exceeds this predetermined maximum threshold $\hat{P}_{CMAX}(i)$. In contrast, when these conditions are not being experienced by the UE 105, there may be efficient or optimized allocation of uplink transmit power across the component carriers using standard allocation settings (without modification of the power scaling factor using the features according to the exemplary embodiments). When the total uplink transmit power is less than or equal to the predetermined maximum threshold $\hat{P}_{CMAX}(i)$, in 315, the UE 105 maintains using the current allocation setting for the component carriers. In 320, the UE 105 allocates the power to the component carriers.

Returning to 310, when the total uplink transmit power is greater than the predetermined maximum threshold $\hat{P}_{CMAX}(i)$, in 325, the UE 105 allocates power across the components carriers based on a fair distribution. As described above, the fair distribution may be results corresponding to using a water-filling algorithm. For example, each of the component carriers may be allocated a same amount of the available uplink transmit power. In another example, the "fill" for the PCC may be provided with a greater amount of the power than the SCCs. In this manner, the component carriers are set with an uplink transmit power that may be used for a period of time. It should be understood that the water filling algorithm is only one example of a fair distribution algorithm and other algorithms may be used.

In 330, the UE 105 tracks the average BLER for the PCell and the SCells over a duration of time. Again, the BLER values may be measured during subframes when the PCell is with the UCI. However, the use of the subframes when the PCell is with the UCI is only exemplary and other subframes may be used by the exemplary embodiments. The exemplary embodiments may ensure that corresponding subframes are used for the PCell and SCells, with or without the UCI. As described above, the BLER values may be determined using various operations such as a sliding window algorithm or an IIR algorithm.

It is noted that the period of time in which the fair distribution of the uplink transmit power may be based on a minimum duration in which the BLER values may be measured. It is also noted that the period of time in which the BLER values are measured may be based on a minimum duration for an accurate average BLER value to be determined. For example, a single BLER value may provide an inaccurate BLER average. However, too many BLER values may provide redundant data in determining an accurate BLER average. Thus, the measurement application 125 may measure BLER values for a duration of time until a reliably accurate BLER average is determined. As the duration of time to use the fair distribution power allocation setting directly corresponds to the duration of time used to measure the BLER values, these durations of time may be identical, but they are not required to be identical.

In 335, the UE 105 determines whether the uplink BLER for the PCell is above a BLER threshold. As noted above, the BLER threshold may be a predetermined value that is predefined and stored in the NVM. If the uplink BLER for the PCell is above the BLER threshold, in 340, the UE 105 adjusts the power allocation for the PCell. Specifically, the UE 105 may provide an increased power scaling factor on the PCell by a Delta in each BLER window until the uplink BLER for the PCell is at most the BLER threshold. Once the uplink BLER for the PCell has fallen to the BLER threshold or further below, in 320, the UE 105 allocates the power to the PCell based on the modified power scaling factor.

Returning to 335, if the uplink BLER for the PCell is equal to or less than the BLER threshold, in 342, the UE 105 adjusts the power allocation for the PCell. Specifically, the UE 105 may provide a decreased power scaling factor on the PCell. To prevent over-allocating power to the PCell, the UE 105 may decrease the amount of power allocated to the PCell while still maintaining the uplink BLER to be equal to or less than the BLER threshold. For example, the Delta used to increase the power scaling factor may also be used to decrease the power scaling factor under these circumstances.

In 345, the UE 105 determines whether the uplink BLER for a first SCell (if more than one SCell) is less than the BLER threshold. It is again noted that using the same BLER threshold for the PCell and the SCells is only exemplary and a different BLER threshold may be used. If the uplink BLER for the first SCell is above the BLER threshold, in 355, the UE 105 adjusts the power allocation for the first SCell using the increase in power scaling factor with Delta in each BLER window until the uplink BLER reaches the BLER threshold. Thus, in 350, the UE 105 allocates the power to the PCell and the first SCell based on the modified power scaling factor (a decrease for the PCell and an increase for the SCell).

If the uplink BLER for the first SCell is equal to or below the BLER threshold, in 355, the UE 105 determines whether there are any further SCells such as a second SCell. Each further SCell may be analyzed to determine whether a modified power scaling factor is to be applied in determining the power to allocate to the corresponding SCell. It is noted that the decrease in the power scaling factor as used for the PCell may also be used for the SCell.

It is noted that the exemplary embodiments are described with regard to a measurement of a connectivity parameter being the BLER. However, the use of the BLER is only exemplary. The exemplary embodiments may be modified to be used with other measurements of other types of connectivity parameters (e.g., RSSI, RSRP, RSRQ, PHR, etc.).

The exemplary embodiments provide a device, system, and method of adaptively adjusting a power scaling factor in allocating an uplink transmit power to component carriers used by a UE for a carrier aggregation functionality. When the total uplink transmit power of the UE across all the component carriers exceeds a predetermined maximum threshold, the UE may be configured to perform the adjustment to the power scaling factor. In this manner, a conventional approach where the PCell with UCI is potentially over-allocated an available uplink transmit power is prevented and an efficient amount of the available uplink transmit power is allocated to the PCell with UCI such that the SCells may be provided with a more stable and greater amount of the available uplink transmit power.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
at a user equipment (UE) configured with a carrier aggregation functionality including a primary component carrier (PCC) and a secondary component carrier (SCC), the UE using a first transmit power for an uplink transmission on the PCC and using a second transmit power for the uplink transmission on the SCC:
determining whether a total transmit power including the first and second transmit powers for the uplink transmission exceeds a predetermined threshold;
when the total transmit power exceeds the predetermined threshold, adjusting the first transmit power based on a connectivity parameter for the PCC; and
adjusting the second transmit power based on the adjusting of the first transmit power.

2. The method of claim 1, wherein the connectivity parameter is a block error rate (BLER).

3. The method of claim 1, further comprising:
when the total transmit power exceeds the predetermined threshold, allocating a first initial transmit power to the PCC and a second initial transmit power to the SCC.

4. The method of claim 3, wherein the first and second initial transmit powers are based on a fair distribution to share an available transmit power.

5. The method of claim 4, wherein the fair distribution is results of a water-filling algorithm.

6. The method of claim 3, wherein, when the connectivity parameter for the PCC is within a range of predetermined connectivity parameter values, the adjusting the first transmit power comprises decreasing a first PCC power scaling factor associated with the first initial transmit power to a second PCC power scaling factor, the method further comprising:
allocating an adjusted PCC transmit power to the PCC based on the second PCC power scaling factor.

7. The method of claim 6, wherein the adjusting the second transmit power comprises allocating at least a portion of a remaining available transmit power, the remaining available transmit power being a total available transmit power less the adjusted PCC transmit power.

8. The method of claim 3, wherein, when the connectivity parameter for the PCC is outside a range of predetermined connectivity parameter values, the adjusting the first transmit power comprises increasing a first PCC power scaling factor associated with the first transmit power to a second PCC power scaling factor, the method further comprising:
allocating an adjusted PCC transmit power to the PCC based on the second PCC power scaling factor.

9. The method of claim 8, wherein the adjusting the second transmit power comprises allocating at least a portion of a remaining available transmit power, the remaining available transmit power being a total available transmit power less the adjusted PCC transmit power.

10. The method of claim 1, wherein the determining the connectivity parameter for the PCC is performed during a subframe comprising an uplink control information (UCI).

11. The method of claim 8, wherein the increasing the power scaling factor associated with the first transmit power of the PCC is an increase by a delta indicating a predetermined power scaling step.

12. The method of claim 11, further comprising:
(a) increasing the first transmit power by the delta to generate a first modified transmit power;
(b) determining a further connectivity parameter for the PCC;
(c) determining whether the further connectivity parameter for the PCC is outside the range of the predetermined connectivity threshold;
(d) when the further connectivity parameter of the PCC is outside the range of the predetermined connectivity threshold, increasing the first modified transmit power by the delta.

13. The method of claim 12, further comprising:
repeating (a)-(d) until the further connectivity parameter of the PCC is within the range of the predetermined connectivity threshold.

14. The method of claim 7, wherein the adjusting the second transmit power comprises:
adjusting the second transmit power based on whether a second connectivity parameter for the SCC is outside a range of second predetermined connectivity parameter values;
when the connectivity parameter for the SCC is within the range of the second predetermined connectivity parameter values, decreasing a first SCC power scaling factor associated with the second initial transmit power to a second SCC power scaling factor;

when the connectivity parameter for the SCC is outside the range of the second predetermined connectivity parameter values, increasing the first SCC power scaling factor to a third SCC power scaling factor; and allocating an adjusted SCC transmit power to the SCC based on one of the second and third SCC power scaling factors.

15. A user equipment (UE), comprising:
a transceiver configured to connect the UE to a first network component serving a primary component carrier (PCC) and a second network component serving a secondary component carrier (SCC), the UE using a first transmit power for an uplink transmission on the PCC and using a second transmit power for the uplink transmission on the SCC; and
a processor determining whether a total transmit power including the first and second transmit powers for the uplink transmission exceeds a predetermined threshold, when the total transmit power exceeds the predetermined threshold, the processor adjusting the first transmit power based on a connectivity parameter for the PCC, the processor adjusting the second transmit power based on the adjusting of the first transmit power.

16. The user equipment of claim 15, wherein the connectivity parameter is a block error rate (BLER).

17. The user equipment of claim 15, wherein, when the connectivity parameter for the PCC is within a range of predetermined connectivity parameter values, the processor adjusts the first transmit power by decreasing a PCC power scaling factor, and wherein the processor allocates an adjusted PCC transmit power to the PCC based on the decreased PCC power scaling factor.

18. The user equipment of claim 15, wherein, when the connectivity parameter for the PCC is outside a range of the predetermined connectivity parameter values, the processor adjusts the first transmit power by increasing a PCC power scaling factor, and wherein the processor allocates an adjusted PCC transmit power to the PCC based on the increased PCC power scaling factor.

19. The user equipment of claim 15, wherein the connectivity parameter for the PCC is measured during a subframe comprising an uplink control information (UCI).

20. An integrated circuit, comprising:
circuitry to determine whether a total transmit power including a first transmit power and a second transmit power for an uplink transmission exceeds a predetermined threshold, the first uplink transmission being used on a primary component carrier (PCC) of a carrier aggregation functionality, the second uplink transmit power being used on a secondary component carrier (SCC) of the carrier aggregation functionality;
when the total transmit power exceeds the predetermined threshold, circuitry to adjust the first transmit power based on a connectivity parameter for the PCC; and
circuitry to adjust the second transmit power based on the adjusting of the first transmit power.

21. The integrated circuit of claim 20, further comprising:
circuitry configured to allocate a first initial transmit power to the PCC and a second initial transmit power to the SCC when the total transmit power exceeds the predetermined threshold, wherein the first and second initial transmit powers are based on a fair distribution to share an available transmit power, wherein the fair distribution is results of a water-filling algorithm.

22. The integrated circuit of claim 21, wherein, when the connectivity parameter for the PCC is within a range of predetermined connectivity parameter values, the adjusting the first transmit power comprises decreasing a first PCC power scaling factor associated with the first initial transmit power to a second PCC power scaling factor, the integrated circuit further comprising:
circuitry configured to allocate an adjusted PCC transmit power to the PCC based on the second PCC power scaling factor.

* * * * *

UNITED STATES PATENT AND TRADEMARK OFFICE
CERTIFICATE OF CORRECTION

PATENT NO. : 11,076,359 B2
APPLICATION NO. : 16/607169
DATED : July 27, 2021
INVENTOR(S) : Ji et al.

It is certified that error appears in the above-identified patent and that said Letters Patent is hereby corrected as shown below:

In the Claims

Claim 5, Column 14, Lines 4-5:
"The method of claim 4, wherein the fair distribution is results of a water-filling algorithm." should read "The method of claim 4, wherein the fair distribution is a result of a water-filling algorithm."

Claim 21, Column 16, Line 27:
"distribution is results of a water-filling algorithm." should read "distribution is a result of a water-filling algorithm."

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*